June 6, 1967

R. W. SEARLE 3,323,367

GRIP INDICATOR

Filed Dec. 1, 1964

INVENTOR
RAYMOND W. SEARLE
BY
*Nicholas A. Pandiscio*
ATTORNEY

United States Patent Office 3,323,367
Patented June 6, 1967

3,323,367
GRIP INDICATOR
Raymond W. Searle, Weston, Mass., assignor to Vibrac Corporation, Chelmsford, Mass., a corporation of Massachusetts
Filed Dec. 1, 1964, Ser. No. 414,987
8 Claims. (Cl. 73—379)

ABSTRACT OF THE DISCLOSURE

The specification describes means for measuring the manual pressure exerted on the grip or handle portion of an athletic club. The apparatus comprises one or more sensors each consisting of a resilient conductive material whose electrical resistance changes when it is compressed, plus conductive contact elements disposed on opposite sides of the resilient material. Each sensor is connected via its contact elements to a source of electrical current and means for indicating changes in the magnitude of the current flowing through the sensor as a result of changes in resistance produced by manual compression of the sensor.

---

This invention relates in general to means for measuring manual pressure on an implement and more particularly to apparatus for measuring and indicating the grip exerted on the handle of an athletic club.

In teaching or practicing sports such as golf or tennis, one of the important factors is the grip exerted by the player on the club or racket. In both sports, difficulty ensues from too loose a grip just as well as from too tight a grip. Moreover, in the case of golf, there exists the problem of one hand overriding the other. The exact pressure to be exerted is difficult for an instructor to convey to a student even with demonstration; what is considered a tight grip by the instructor may in fact be a moderate grip to the other. Accordingly, there exists the need for a device which will aid the instructor in advising the student on the tightness of his grip.

The principal object of the present invention is to provide apparatus for measuring and indicating the grip exerted on the handle of an athletic club.

A further object of the invention is to provide a teaching aid adapted to indicate the pressure exerted by the hand of a player on an athletic club, with means for indicating whether one hand of the player exerts a tighter grip than the other.

A more specific object of the invention is to provide a grip indicator for athletic clubs such as golf clubs and tennis rackets which is compact and can be mounted directly on the club.

Other objects and many of the attendant advantages of the present invention will become more readily apparent when reference is had to the following detailed specification which is to be considered together with the accompanying drawings wherein.

Figure 1:
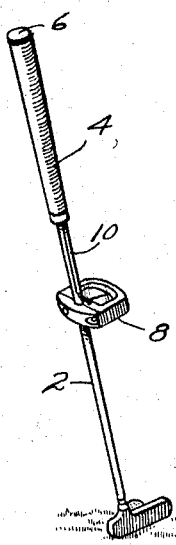
FIG. 1 is a perspective view of a golf club embodying a preferred form of the invention.
Figure 2:
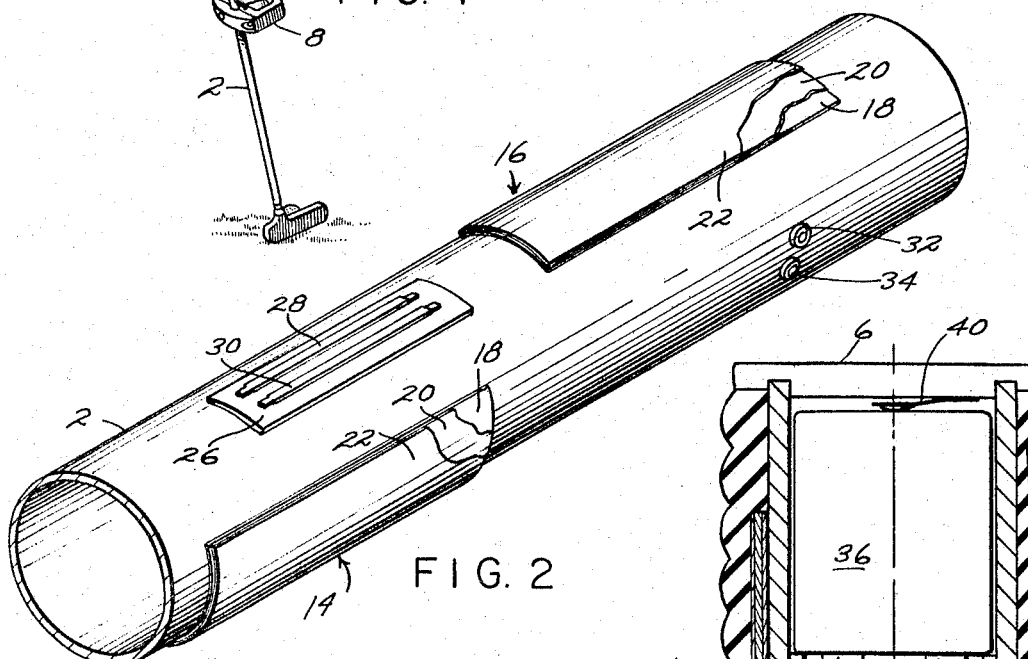
FIG. 2 is a view on an enlarged scale of the upper end of the golf club of FIG. 1 with its grip removed.

Turning first to FIG. 1 there is illustrated a putter comprising a hollow steel shaft 2 provided with a leather grip 4 and a removable end cap 6. Also mounted on shaft 2 is an indicator 8 which is coupled to grip-sensing means by means of a pair of leads forming part of an insulated cable 10. The leather grip 4 covers the grip-sensing means, details of which are illustrated in FIG. 2. The grip sensing means consists of two identical sensors 14 and 16 positioned so that sensor 14 will be gripped by the fingers of the right hand of a right-handed player while sensor 16 will be gripped by the fingers of the left hand of the same player. The two grip sensors are of identical sandwich construction. Each comprises a bottom-contact layer 18 formed of a conductive-metal foil, an intermediate layer 20 formed of resilient-conductive plastic 20, and an upper-contact layer 22 also formed of a conductive-metal foil. The bottom foil contact 18 is insulated from shaft 2. Preferably but not necessarily, foil contact 18 is secured to the shaft, e.g., by an insulating cement or by an adhesive insulating tape. The resilient conductive-plastic layer 20 is not adhesively secured to either of the foil contacts 18 and 22 but is maintained in intimate contact with them by virtue of the surrounding grip 4. Consequently it is capable of expansion movement laterally of the foil contacts when squeezed by the player's fingers. Separate leads (not shown) are attached to each of the foil contacts of sensors 14 and 16. These leads couple the two sensors to the circuit shown in FIG. 5.

Figure 3:
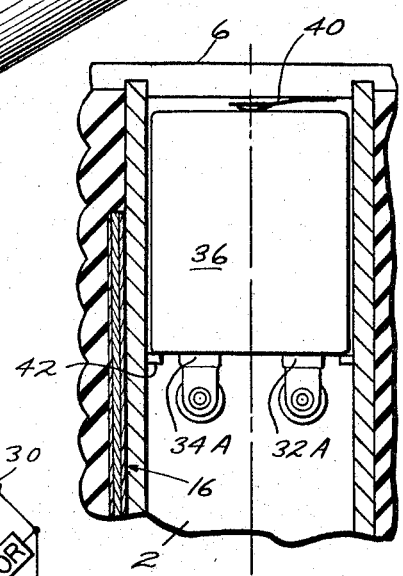
FIG. 3 is a sectional view of the upper end of the club of FIG. 1.

Also mounted on the metal shaft 2 in the region of the two sensors is an insulating strip 26 carrying two metal film resistors 28 and 30. These resistors also are coupled to sensors 14 and 16 by leads (not shown) in the manner hereinafter described. Additionally, two rivet-type terminals 32 and 34 are anchored in suitable holes provided in the shaft. These terminals include L-shaped contacts disposed on the inside of the shaft. These L-shaped contacts are identified as 32A and 34A respectively in FIG. 3. These contacts support and make electrical contact with a dry-cell battery 36 which is mounted within the shaft and which is held in place against the terminals by means of a leaf spring 40 attached to the removable end cap 6. If desired, the shaft may be provided with an internal shoulder 42 against which the battery can be supported. The terminals 32 and 34 are connected by suitable leads (not shown) to the other elements of the system as hereinafter described.

The two sensors 14 and 16, the film resistor assembly, the rivet-type terminals 32 and 34, and the connecting leads (not shown) are covered by the leather grip 4 which preferably but not necessarily is of the kind that is wound onto the shaft 2. However, although not shown, it is to be understood that an intermediate lining may be used to separate the aforesaid circuit elements from the leather grip 4.

Figure 4:
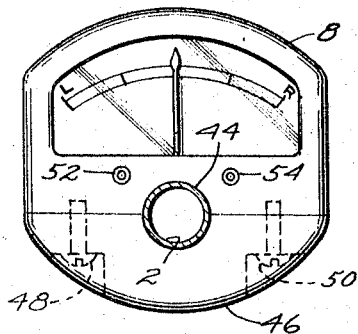
FIG. 4 is an enlarged view of the indicator forming part of the apparatus of FIG. 1.

The indicator 8 is a microammeter and preferably has a case constructed as shown in FIG. 4 to facilitate mounting. The meter shown in FIG. 4 is provided with a semi-circular slot 44 in its bottom side to accommodate the steel shaft 2. The meter is clamped in place by a bracket 46 which also has a semicircular slot for the shaft. The bracket 46 is secured to the meter by means of suitable screws 48 and 50. In the illustrated embodiment the meter has a pair of screw-type terminals 52 and 54 to which the leads in cable 10 can be secured to complete the circuit of the system. This arrangement facilitates removal of the indicator when it is desired to use the club without the indicator. In fact this arrangement makes it possible for the invention to be built into the handle of the conventional putter with the user adapting it for grip indication simply by attaching the indicator 8 and connecting the leads to terminals 52 and 54.

Figure 5:
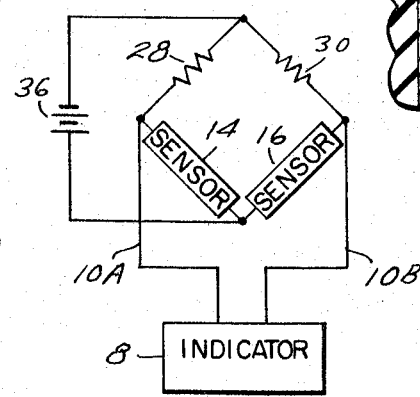
FIG. 5 is a circuit diagram illustrating how the invention is adapted to measure the grip exerted by each hand of the player holding the golf club.

FIG. 5 illustrates the circuit formed with the foregoing electrical elements. FIG. 5 is a conventional bridge circuit consisting of the two film resistors 28 and 30 in different legs and the two sensors in two other legs. One terminal of the battery 36 is coupled to the junctions of resistors 28 and 30 while the other battery terminal is coupled to the junction of the foil contacts 18 of sensors 14 and 16. The junction of the resistor 28 and foil contact 22 of sensor 14 and the junction of resistor 30 and foil contact 22 of sensor 16 are coupled to terminals 52 and 54 of the microammeter by two leads 10A and 10B which form part of cable 10.

With the foregoing system, it is possible to determine the extent of the grip exerted by each hand of the player. Squeezing sensor 16 will cause a change in the effective resistance of the plastic conductor located between its foil contacts 18 and 22, thereby unbalancing the bridge and causing the needle of the microammeter to swing in one direction. If the left hand is removed and the right hand is applied to the shaft, the effective resistance of the other sensor 14 will be changed in response to the pressure of the fingers of the right hand, causing the needle of the meter to swing in the opposite direction. In this connection it is to be observed that for a two-handed system of the type described, it is preferred to use a zero-center meter. Thus if the golf club is gripped with the two hands with the fingers of both hands exerting equal pressure, the needle of the microammeter will point substantially to zero. If thereafter one hand is gripped tighter than the other, the needle will swing in the direction determined by the hand exerting the tightest grip.

For a more accurate system, the film resistors are replaced by small trimmer-type variable resistors which facilitate zeroing of the meter when no hand pressure is applied to the sensors. In the latter case the trimmers are mounted inside the shaft where they are accessible for adjustment without removal of the leather grip. In the case of a one handed implement such as a tennis racket (FIGS. 6 and 7), only one sensor is required and the bridge circuit of FIG. 5 is altered to the extent that one of the sensors is replaced by a fixed or trimmer-type resistor.

It has been determined that best performance is obtained by having the foil contacts of the same size as the intermediate resilient conductive plastic so as to obtain maximum contact therebetween. Additionally, the lack of an adhesive between the plastic conductor and the foil contacts has been found to give maximum response. If the conductive plastic is physically secured to the foil contact members so as to be incapable of relative lateral motion, the change in effective resistance of the electrical path between the foil contacts is too small for satisfactory operation. Of course the response of each sensor to pressure also is a function of the composition of the conductive plastic. In practice it has been found suitable to use a conductive plastic comprising resiliently compressible polyethylene having dispersed therein small particles of carbon. The latter render the plastic conductive. It is appreciated that other forms of plastic can be used as the matrix and other forms of conductors in particle form can be dispersed in the matrix. Such conductive plastics are well known in potentiometer art. While the theory of operation is not fully understood, it is believed that the poorer response attained when the plastic semiconductor layer is adhesively secured to the foil contacts is due to the fact that the conductive plastic cannot expand laterally relative to the foil contacts.

With the system described and illustrated, it is believed to be apparent that a quick and rapid indication can be had as to the relative pressure exerted by the two hands of the player. The system is a good teaching aid permitting an instructor to clearly demonstrate to a student how to grip a golf club handle. The invention is applicable to other two-handed athletic clubs, such as baseball bats, as well as to one-handed implements such as tennis rackets.

Figure 6:
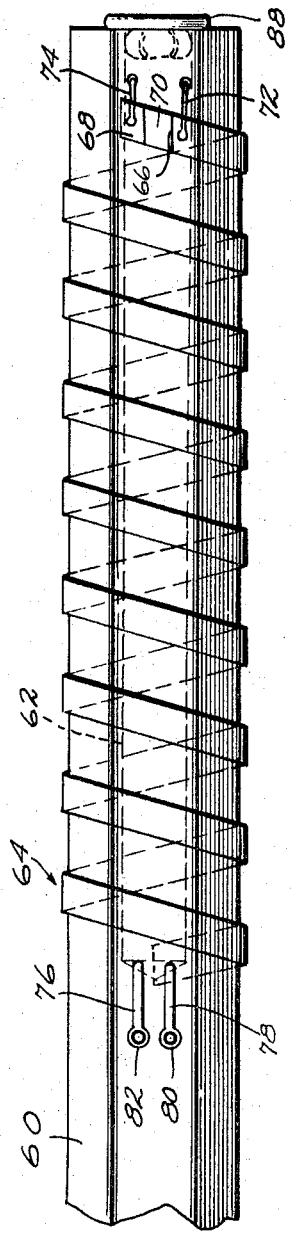
FIGS. 6 and 7 illustrate how the invention is applied to the handle of a tennis racket.
Figure 7:
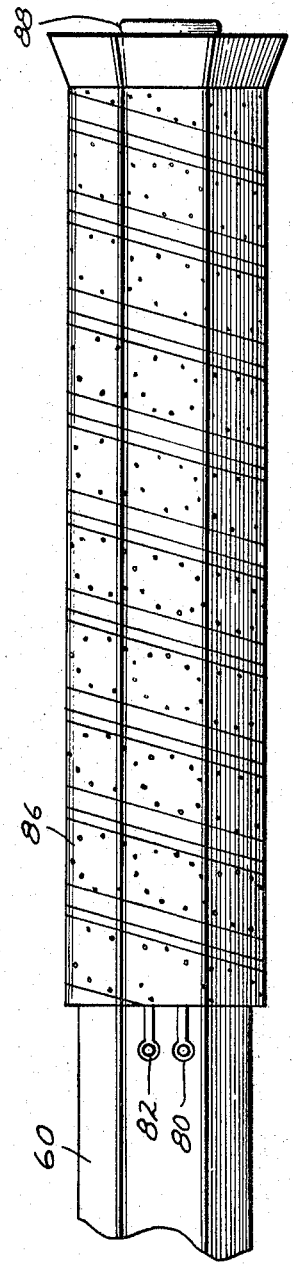

FIGS. 6 and 7 show how the invention is applied to a tennis racket handle 60. The wooden handle is provided with a central bore 62 which is sized to accept the components, i.e., resistors and battery (not shown), of a grip indicator bridge circuit substantially the same as that shown in FIG. 5. Wrapped around the handle is a sensor 64 comprising inner and outer foil contacts 66 and 68 respectively and an intermediate resilient conductive plastic 70. The latter is not cemented to the foil contacts. The ends of the two foil contacts nearest the end of the racket handle are connected to insulated leads 72 and 74 which extend through suitable holes into the central bore 62 where they are connected to the resistors forming part of the bridge circuit. The latter has a pair of output leads 76 and 78 which are brought out from bore 62 through suitable holes and are connected to a pair of female plugs 80 and 82 respectively mounted on the handle. These plugs are intended to accept mating plugs coupled to the input terminals of a microammeter (not shown). The latter may be releasably clamped to the handle in the manner of the meter shown in FIG. 1, or may be separated from the handle. The sensor 64 and the leads 72 and 74 are covered by a grip or covering 86 formed of a suitable material such as leather. The grip 86 also covers part of the output leads 76 and 78 but plugs 80 and 82 are left exposed for connection to a meter. A snap-type button 88 seals off bore 62 and the circuit elements disposed therein. Thus, except for plugs 80 and 82, a tennis racket embodying the invention is not noticeably different in appearance from a conventional racket. If desired, the plugs may be embedded so that they are flush with the surface of the handle. This will make them even less noticeable; also the racket may be handled with minimum risk of injury to the plugs.

The sensor involved in the apparatus of FIGS. 6 and 7 functions the same as sensors 14 and 16 shown in FIG. 2. When the racket handle is squeezed the effective resistance across the foil contacts will change. This unbalances the bridge circuit in which the sensor is connected and causes the needle of the output meter to move in accordance with the tightness of the grip on the handle.

Although not illustrated, it is contemplated that the invention also has utility in physical therapy. In this connection it is contemplated that the single sensor arrangement shown in FIGS. 6 and 7 may be used to test the grip of a patient undergoing therapy to recover the use of hand muscles. The sensitivity of the device is such that relatively small changes in finger strength can be determined. For such purposes the implement embodying the sensor need not be an athletic club such as a tennis racket but may be a simple body sized and shaped to be readily gripped by a person's hand.

It is to be understood that the invention is not limited in its application to the details of construction and arrangement of parts specifically described or illustrated, and that within the scope of the appended claims, it may be practiced otherwise than as specifically described or illustrated.

I claim:

1. In combination with the handle of an athletic club or the like having a configuration so that it may be gripped by the hand of a user, a grip sensor mounted on said handle, said sensor comprising (1) a first conductive member disposed next to said handle, (2) a strip of resilient conductive plastic that exhibits a change in electrical resistance when it is compressed, said conductive plastic overlying said first conductive member, and (3) a second flexible conductive member overlying said strip, said strip making electrical contact with both of said conductive members, a grip member surrounding and concealing said sensor, said grip being made of a pliant material so that a pressure exerted thereon by the user's hand is effective to compress said sensor and thereby change the electrical resistance of said strip, and a pair of electrical terminals mounted on said handle, said terminals being connected to said conductive members whereby said sensor may be coupled by said terminals to means for measuring and indicating changes in said electrical resistance produced by the pressure of the user's hand on said grip member, said terminals being located so as not to interfere with the user's hand.

2. The combination of claim 1 wherein said sensor is wound spirally about said handle.

3. In combination with the handle of an athletic club or the like having a configuration so that it may be gripped by the hand of a user, a grip sensor mounted on said handle, said sensor comprising (1) a first conductive member disposed next to said handle, (2) a strip of resilient conductive plastic that exhibits a change in electrical resistance when it is compressed, said conductive plastic overlying said first conductive member, and (3) a second flexible conductive member overlying said strip, said strip making an electrical contact with both of said conductive members, a grip member surrounding and concealing said sensor, said grip being made of a pliant material so that a pressure exerted thereon by the user's hand is effective to compress said sensor and thereby change the electrical resistance of said strip, a pair of electrical terminals mounted on said handle and connected to said conductive members, said terminals being located on said handle so as not to interfere with the user's hand, and a circuit for measuring changes in the electrical resistance of said strip, said measuring circuit comprising means coupled to said terminals for producing an electric current flow through said strip, and means for indicating changes in current flow through said strip due to compression thereof under the pressure exerted by the user's hand.

4. In combination with an athletic club comprising a handle with a pliant grip having a configuration so that it may be gripped by the hands of the user, a first sensor covered by said grip which exhibits a change in electrical resistance when said grip is squeezed, said first sensor comprising a strip of resilient conductive plastic and flexible conductive metal foil members engaging opposite sides of said strip so as to make electrical contact therewith, a second sensor concealed by said grip, said second sensor having substantially the same construction as said first sensor, said censors being spaced from each other so that one sensor is responsive to the pressure of one hand of the user and the other sensor is responsive to the other hand of the user during normal swinging of the club, a current source, means connecting said current source to the said metal foil members of each sensor so that an electrical current is caused to flow through the conductive plastic strip of each sensor, and means coupled to said sensors for indicating changes in flow of current through said sensors due to compression of said conductive plastic strips produced by the hand pressure of the user.

5. In combination with an athletic club comprising a handle with a grip having a configuration so that it may be gripped by both hands of the user, a first sensor in said grip which exhibits a change in electrical resistance when squeezed, said first sensor comprising a strip of resilient conductive plastic and flexible contact members engaging opposite sides of said strip so as to make electrical contact therewith, a second electrical sensor having the same construction as said first sensor, said sensors being spaced from each other so that one sensor is responsive to the pressure of one hand of the user and the other sensor is responsive to the other hand of the user during normal swinging of the club, two electrical resistors, means connecting said two resistors and said two sensors in a bridge circuit, a source of electrical current, means connecting said bridge circuit to said source of electrical current, and an electrical indicator connected to said bridge circuit and adapted to respond to changes in current flow through said sensors produced by the hand pressure of the user.

6. The combination of claim 5 wherein said electrical indicator is mounted on said club.

7. The combination of claim 5 wherein said current source comprises a battery disposed within said handle.

8. The combination of claim 5 wherein said resistors are attached to said handle.

References Cited

UNITED STATES PATENTS

| | | | |
|---|---|---|---|
| 2,951,817 | 9/1960 | Myers | 338—36 |
| 2,954,697 | 10/1960 | Geist | 73—379 |
| 3,206,980 | 9/1965 | Nelson | 73—88.5 |

RICHARD C. QUEISSER, *Primary Examiner.*

J. H. WILLIAMSON, *Assistant Examiner.*